US006655827B1

(12) United States Patent
Tortosa

(10) Patent No.: US 6,655,827 B1
(45) Date of Patent: Dec. 2, 2003

(54) MIXING APPARATUS FOR FORMING AND FINISHING VISCOUS LIQUIDS WITH A REACTANT, CATALYST OR COAGULANT

(76) Inventor: Pedro J. Tortosa, 1431 Co. Rd. V., Houlton, WI (US) 54082

( * ) Notice: Subject to any disclaimer, the term of this patent is extended or adjusted under 35 U.S.C. 154(b) by 685 days.

(21) Appl. No.: 09/605,364

(22) Filed: Jun. 29, 2000

Related U.S. Application Data

(62) Division of application No. 09/080,296, filed on May 18, 1998, now Pat. No. 6,082,889, which is a division of application No. 08/694,229, filed on Aug. 8, 1996, now Pat. No. 5,753,282.
(60) Provisional application No. 60/002,155, filed on Aug. 11, 1995.

(51) Int. Cl.[7] .............................................. B01F 15/02
(52) U.S. Cl. .................... 366/131; 137/896; 366/167.1; 366/184
(58) Field of Search ............................ 366/131, 160.1, 366/167.1, 184; 137/896, 897; 99/452; 261/76; 426/519

(56) References Cited

U.S. PATENT DOCUMENTS

| 1,668,136 A | * | 5/1928 | Agthe | 366/167.1 |
| 5,820,259 A | * | 10/1998 | Cummins et al. | 366/167.1 |
| 6,004,024 A | * | 12/1999 | Ho et al. | 366/167.1 |

* cited by examiner

Primary Examiner—George C. Yeung
(74) Attorney, Agent, or Firm—Breneman & Georges; William D. Breneman; Todd A. Vaughn

(57) ABSTRACT

An apparatus for mixing viscous liquids with a reactant, catalyst or coagulant and then finishing such mixture is described which involves forming a viscous first fluid into a thin film by passage through an annulus, then injecting a second fluid into the flowing liquid to form a mixture which is thereafter finished downstream of injection of the second fluid. The mixture from the mixer is finished using a finisher associated with and downstream of the mixer. Injection may be through either annulus-forming surface or both in various patterns. The particular mixer and finisher described are adapted for use in the uniform mixing of rennet and pre-cheese. The mixer and finisher are adapted for modification and facile disassembly for cleaning to maintain sanitary standards.

3 Claims, 4 Drawing Sheets

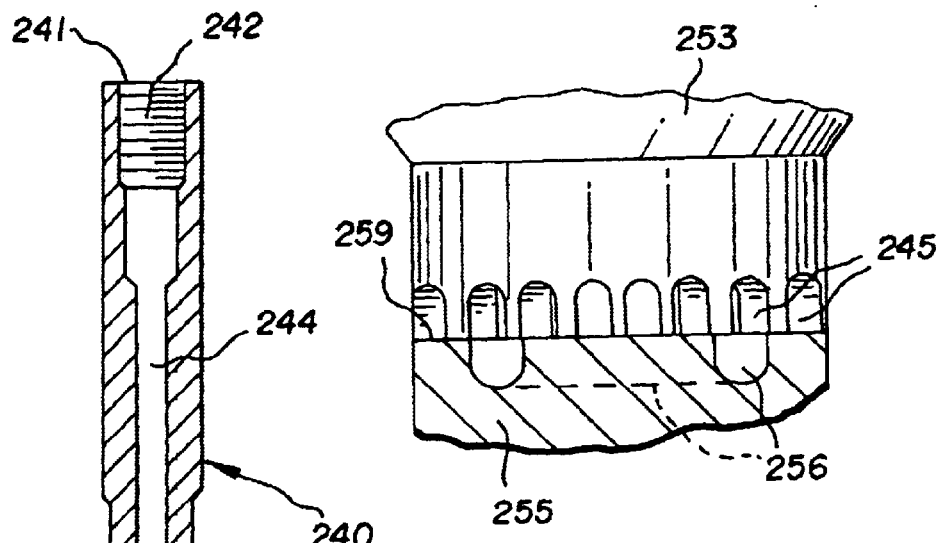
FIG. 4
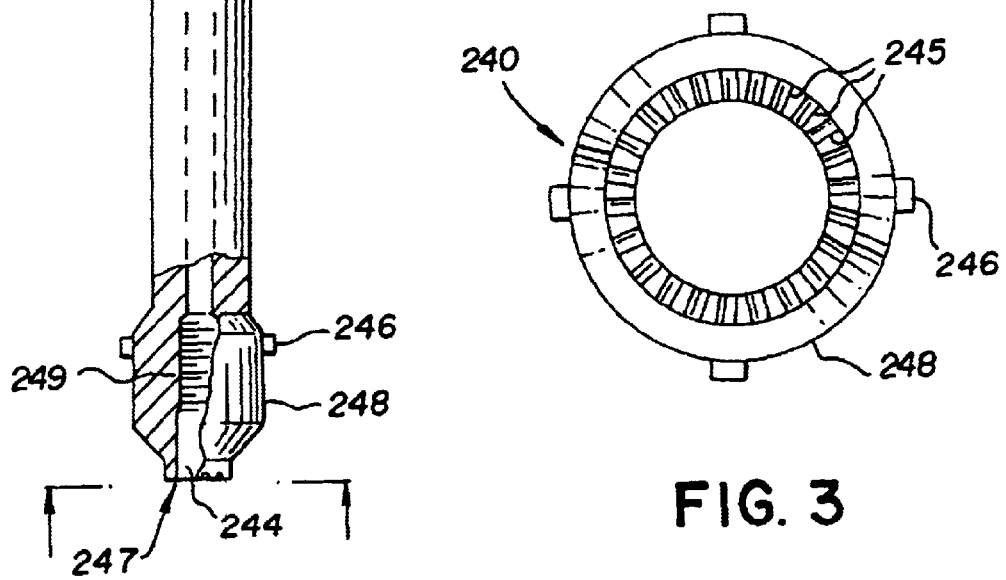
FIG. 3
FIG. 2

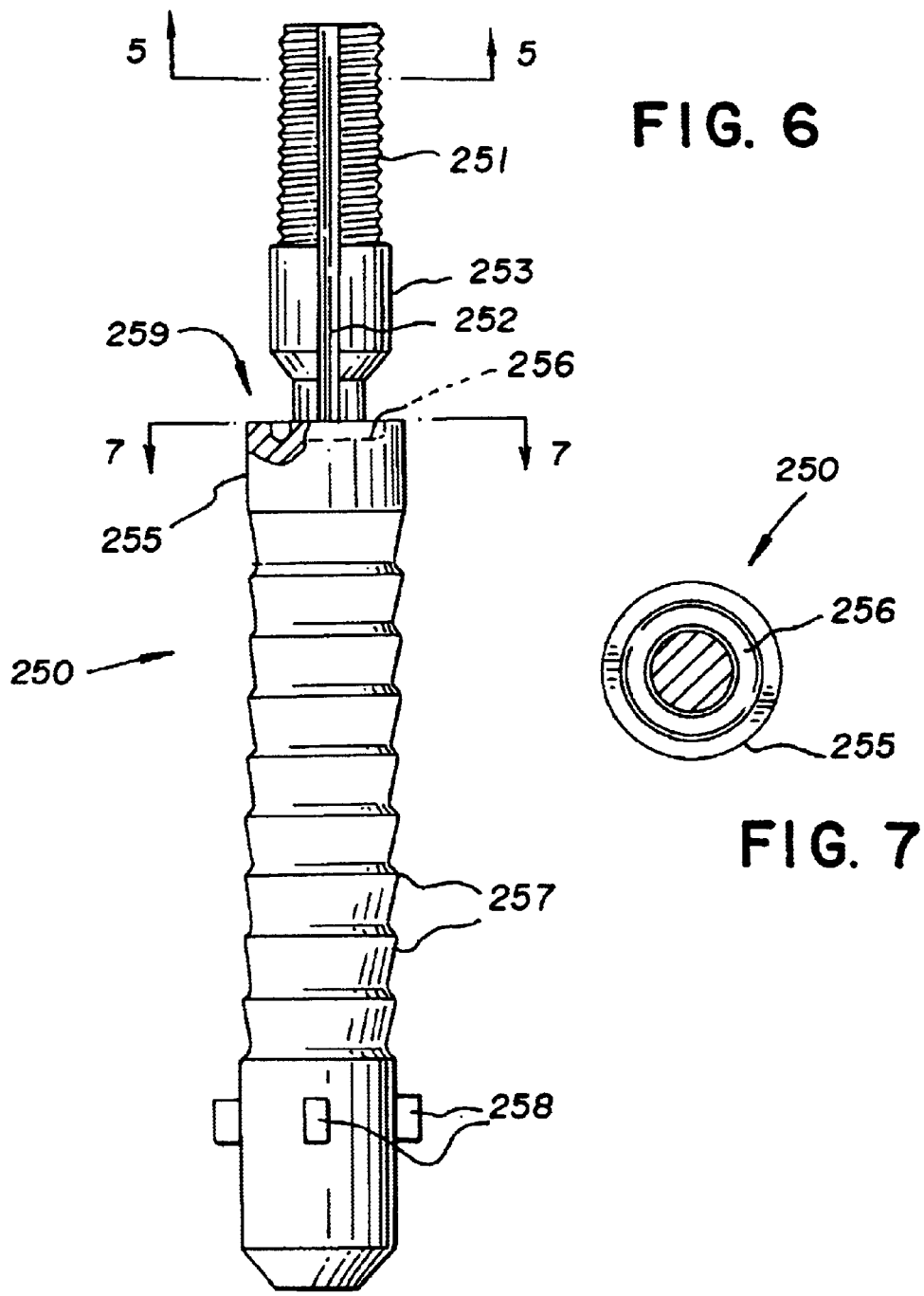

MIXING APPARATUS FOR FORMING AND FINISHING VISCOUS LIQUIDS WITH A REACTANT, CATALYST OR COAGULANT

This application claims the benefit of U.S. Provisional Application No. 60/002,155, filed Aug. 11, 1995. This application is a divisional of application Ser. No. 09/080,296, filed May 18, 1998, now U.S. Pat. No. 6,082,889, which is a divisional of application Ser. No. 08/694,229, filed Aug. 8, 1996, now U.S. Pat. No. 5,753,282, and also claims the benefit thereof.

FIELD OF THE INVENTION

The invention relates generally to mixers for fluids and specifically an apparatus for mixing a coagulant such as rennet and precheese.

BACKGROUND OF THE INVENTION

The prior art has used both batch mixing and conduits with interior vanes/baffles to effect mixing. In the preparation of admixtures of coagulant and precheese, such procedures, using conventional mixing devices, often produce uneven mixing and, as a consequence, irregular coagulation occurs.

SUMMARY OF THE INVENTION

The mixer of the present invention is designed to effect rapid uniform mixture of two fluids and is most useful where its attributes are essential, that is, where the combination of fluids interacts or reacts and the product is non-uniform or otherwise detrimentally affected where production of a uniform mixture occurs over time. The advantage of rapid and uniform mixture, in accordance with the present invention, is magnified where (1) at least one of the fluids is a liquid of high viscosity and (2) the viscous liquid is mixed with a second fluid, which is present in small amounts and which, when combined with the viscous fluid, interacts or reacts with the viscous fluid to form a product that impedes or prevents further mixing and/or the uniform interaction and/or reaction of the fluids.

The mixer of the present invention, therefore, finds particular utility in the production of precheese and coagulant mixtures. Precheese is, at present, produced mostly by ultrafiltration of milk to produce a viscous retentate (ultrafiltered milk). The retentate, whose composition corresponds to the targeted cheese product, is thereafter mixed with a cheese-forming agent, a coagulant, such as rennet, to produce a cheese product.

The precheese, which is mixed with coagulant to form the feed that is treated in accordance with the present invention, is suitably formed by ultrafiltration using ultrafiltration devices described in my copending application, Ser. No. 08/694,125, now U.S. Pat. No. 5,817,235, entitled ANTI-TELESCOPING DEVICE FOR SPIRAL WOUND MEMBRANE MODULES, the teaching of which is incorporated herein by reference thereto.

The mixture of precheese and coagulant prepared using the mixing method and mixing device of the present invention can be treated to form a ribbon of cheese in accordance with the continuous cheese coagulation method described in my copending patent application, Ser. No. 08,694,228, now U.S. Pat. No. 5,688,542, entitled CONTINUOUS CHEESE COAGULATION METHOD, the teaching of which is incorporated herein by reference thereto.

A critical step in the production of admixtures of coagulated precheese is the mixing of rennet with the viscous milk retentate. Conventional mixing devices often produce uneven mixing and, as a consequence, irregular coagulation occurs. Irregular coagulation produces layers in the final cheese with poor, unacceptable structure. The viscosity of the retentate makes it difficult to evenly distribute the rennet, particularly because a very small amount of rennet is added to the retentate. The problem of irregular coagulation is exacerbated because retentate coagulates very rapidly in the presence of rennet. The resulting coagulant (solid) makes it very difficult, if not impossible, to disperse the remaining rennet within the remaining liquid retentate. The mixer of the present invention specifically addresses this problem. The sequence of events involved in the mixing of retentate and rennet, in accordance with the present invention, is altered from the conventional sequence, dosing, followed by injecting, followed by mixing (dispersion or diffusion). In the present invention, a new sequence has been adopted, namely, dosing, followed by "dispersion" of retentate (into a thin, annular film) followed by injection of rennet into the "dispersed" retentate.

In the prior art, mixing of rennet with retentate starts by dosing or measuring the relative amounts of the various components to be mixed. Then the retentate and rennet are introduced into a container for batch mixing or are kept flowing in a tube for continuous mixing. Various devices have been used to provide rotating or oscillating blades of various shapes and forms, generally activated by an external source of energy to promote the dispersion of rennet and retentate. For continuous in-line mixing, the liquid mix flows inside a tube with static mixing elements therein.

In the embodiment of the present invention relating to formation of precheese, the method of the present invention involves (a) forming a continuously flowing annular thin film of retentate; and (b) injecting rennet in predetermined small dosage levels into the thin film of flowing retentate. The angle of injection relative to the annular retentate film illustrated herein is radial to the axis of the annulus forming walls, however, any other angle relative to the surface of retentate is acceptable.

Also, in accordance with the present invention, further mixing, in addition to mixing caused by rennet injection into the moving retentate film may occur downstream of the spray/injection apertures.

In accordance with the present invention, dispersion, after combination of coagulant and precheese, is minimized by first dispersing retentate (into a thin annular film) before injecting rennet. In other words, the objective of mixing in the present invention, is to "disperse" the precheese and inject the coagulant so that first contact approximates as much as possible the architecture of a uniform dispersion of coagulant in retentate. Accordingly, the time consumed for combining components and the retention time after injection is minimized during the mixing continuum. The short duration of mixing, in accordance with the present invention, avoids partial coagulation. Accordingly, in the present invention, the components to be mixed are first divided into very small, easily-mixable portions. In the embodiment of the present invention relating to the production of precheese, this is done by creating a continuously-flowing thin-film of retentate and a synchronized stream of rennet Referring to FIG. 1, retentate film fills and flows through the annular space between the mixer body 230 and the mixer head 250. The rennet stream is injected, circumferentially into the flowing thin-film of retentate through a series of extremely fine nozzles formed at the interface of the mixer head and mixer body. Optionally, further mixing and/or finishing may occur downstream of rennet injection and as specifically shown in the illustrated embodiment of the mixer of the present invention, this can be achieved by frusto-conically shaped turbulence promoters placed downstream of the injection nozzles.

In the present invention, in order to minimize retention time within the mixer, the retentate is passed through the mixer at a high linear speed which provides the additional benefit of reducing the actual viscosity of the retentate. Most preferably the physical size (internal volume) of the mixer is kept to the absolute minimum required. Also contemplated in accordance with the present invention is the use of a finisher—an optional element that can be installed to effect further mixing. The finisher reinforces the dispersion of the rennet within the retentate and slows down the mix at the mixer outlet to avoid splashes in downstream unit(s) where the coagulant and precheese mixture formed by the mixer is coagulated and cheese is formed. The finisher of the present invention illustrated in FIGS. 8 and 9 results in only minimal addition to the internal volume of the mixer.

BRIEF DESCRIPTION OF THE DRAWINGS

FIG. 2 is an elevational view in section of the head adapter.

FIG. 3 is a bottom plan view of the head adapter illustrated in FIG. 2.

FIG. 4 is a partial view taken from FIG. 1.

FIG. 5 is a sectional view taken along lines 5—5 of FIG. 6.

FIG. 6 is an elevational view of the mixer head.

FIG. 7 is a sectional view taken along lines 7—7 of FIG. 6.

DETAILED DESCRIPTION OF THE DRAWINGS

Figure 1:
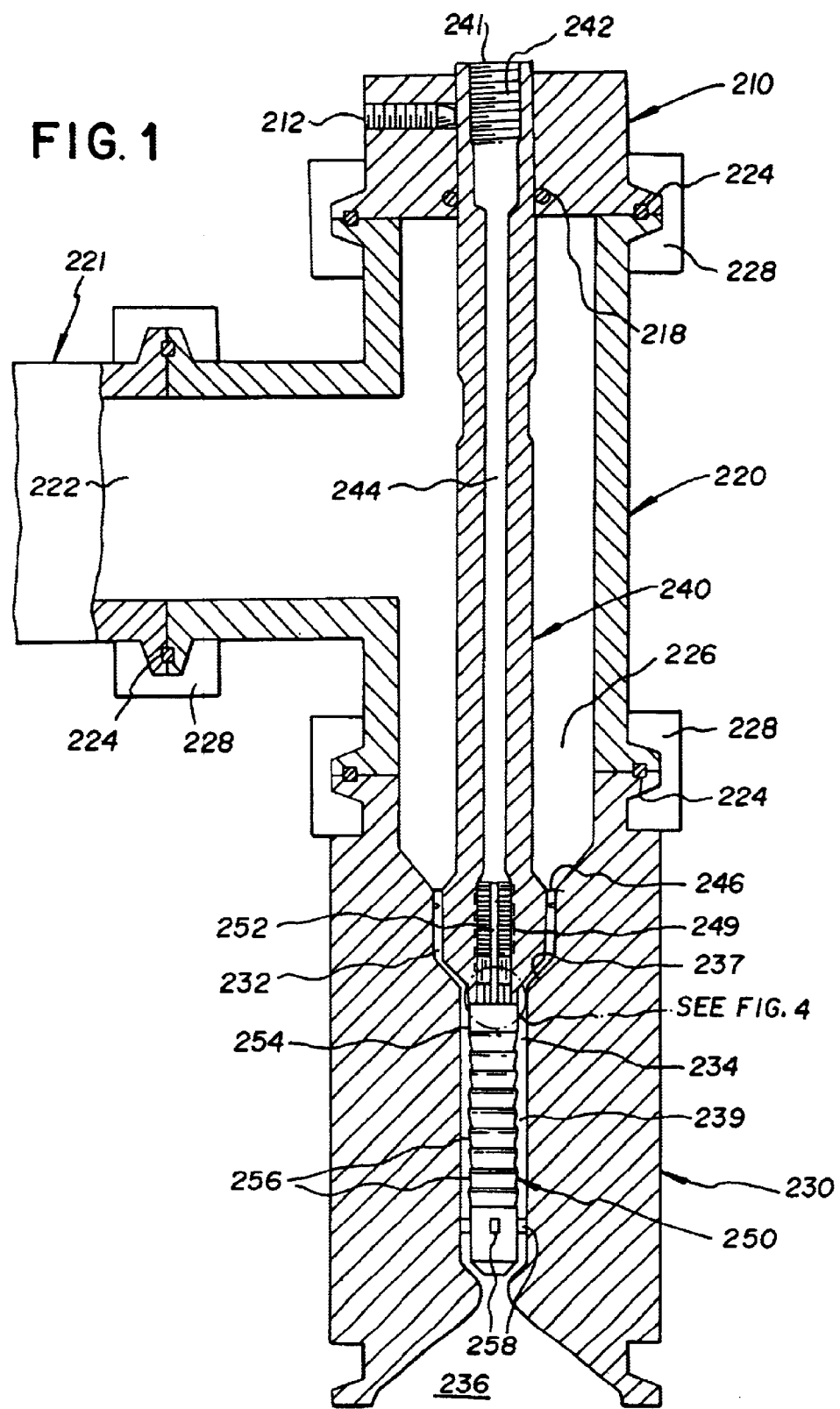
FIG. 1 is an elevational view in section of the apparatus for mixing fluids.

Referring to FIG. 1, mixing assembly 200 is comprised of T-connector cap 210, T-connector 220, mixer body 230, mixer head adapter 240, and mixer head 250. T-connector 220 is a simple, standard, sanitary 2-inch Tee that serves as inlet for retentate and as holder for mixer body 230 and T-connector cap 210. T-connector gasket 224 is used at the interfaces of T-connector cap 210 and T-connector 220, T-connector 220 and mixer body 230, and T-connector 220 and retentate inlet pipe 221 that are each held together with a standard sanitary clamp 228.

As shown in FIGS. 1–3, mixer body 230, with mixer head 250 and mixer head adapter 240 in place, forms a receiving chamber 232, an injection (mixer) chamber 234, and expansion chamber 236, also referred to herein, respectively, as the receiving/accelerating, injecting and expansion zones and a turbulence chamber 239. Mixer head adapter 240 is centered within T-connector 220 and attached to T-connector cap 210 with set screw 212 in T-connector cap 210. Mixer head adapter 240 includes inlet internal threads 242 for attaching 60 inlet piping from a rennet dosing pump, rennet conduit 244, adaptor centering lugs 246, accelerator 248, bottom surface 247, injector grooves 245 and outlet internal threads 249.

Mixer head 250, as shown in FIGS. 1 and 5–7, has external threads 251, channels or open grooves 252, shoulder 253, retentate receiver 255, circular retentate receiver recess 256, frusto-conical turbulence promoters 257, and centering lugs 258 for centering the mixer head within injection chamber 234.

When used in forming precheese where sanitary conditions have to be maintained and frequent cleaning is required, the architecture of this mixing assembly facilitates disassembly and cleaning. The mixing assembly is suitably fabricated from stainless steel, for example 316L, although plastic as well as other metal alloys may also be used.

The retentate is introduced into T-connector 220 via T-connector retentate inlet 222. Retentate then passes into mixer body 230 via retentate passageway 226 into receiving chamber 232, which is also referred to herein as the retentate acceleration zone, then enters injection chamber 234 and next enters retentate turbulence zone 239.

In the illustrated embodiment of the invention as shown in FIGS. 1–9, rennet is introduced into head adaptor 240 through head adaptor inlet 241. The dosage level of rennet required is calculated based on the volume of retentate being processed. The required rennet is fed to head adaptor 240 from a suitable liquid dosing device. Dosing and devices controlling dosing of rennet and/or other precheese forming coagulants are well known in the art and not a part of the present invention. Internal threads 213 are adapted to couple with a fitting which connects to flexible tubing affixed to a rennet dosing device.

As best shown by referenced to FIGS. 1 and 2, a portion of rennet internal conduit 244 is delimited by the interior wall of the head adaptor bottom section which is internally threaded to engage external threads 251 of mixer head 250.

The exterior surface of these threads 251 and of shoulder 253 of mixer head 250 is provided with four equally spaced grooves 252 which are longitudinally disposed, as best shown in FIGS. 5, 6 and 7. When mixer head 250 is engaged with mixer head adapter 240, bottom surface 247 abuts mixer head engaging surface 259, as best shown in FIGS. 1 and 4. A distribution manifold for the rennet passing through grooves 252 is formed by circular receiver 256 and the overlying portion of the bottom surface 247 of mixer head adapter 240.

The grooving on bottom surface 247 of head adapter 240 is best shown in FIGS. 2, 3 and 4. The radial grooves 245, as shown, extend radially outward from the axis of head adaptor 240, preferably terminating equidistant one from the other and forming circumferentially disposed injecting apertures/ports, whereby the rennet is injected into the retentate flowing through the annulus formed by the interior wall of mixer body 230 and the exterior surfaces of mixer head 250 and mixer head adapter 240.

The surfaces of mixer head adapter 240 and the mixer head 250 in near proximity to mixer body 230 delimit three contiguous zones. The first is retentate accelerating zone 232 where the retentate is accelerated and formed into a thin film. Downstream of accelerating zone 232 is injection zone 234 where the rennet is continuously sprayed into the retentate, preferably substantially normal to the direction/ vector of film flow and also preferably from ejection ports evenly distributed, formed by radial rennet grooves 245. Downstream of injection zone 234 is turbulence 239 which may be used to advantage to effect additional mixture.

Alterative architecture for the mixer, in accordance with the present invention, includes injecting through the exterior wall forming the annular thin film stream, suitably through injection ports that are circumferentially spaced apart or in other arrays and patterns to provide for alternative/ supplemental introduction of rennet through mixer body 230. Injection vectors in an upstream direction or even downstream direction may be used. Injection, as illustrated, is as much a consequence of mixer architecture for forming the injection ports using the assembly of mixer and mixer adapter as by design to provide injection in a direction substantially normal to the plane of flow. Accordingly, injection ports/apertures can be opposed, facing one another with injection from the exterior and interior walls forming the annulus or offset with criss-cross injection and the like. Since the objective is uniform mixture, the array of injection ports is preferably circumferential. Moreover, in the illustrative embodiment of the present invention, the obvious alternative for forming the rennet injection ports is to form radial grooves on surface 259 as poosed to or even in addition to surface 247. The concentric walls forming the annulus, as will be appreciated, are not limited to circular form, other shapes being acceptable and/or convergence or divergence being contemplated, provided only that the dispersion of the annularly flowing fluid is not substantially diminished whereby uniformity of admixture is adversely affected.

The mixer of the present invention may advantageously include a turbulence zone 239 wherein the mixed retentate and rennet are subjected to turbulence while passing over eight turbulence promoters 257, which, as shown, are frustoconical with gradually decreasing wall diameter in the downstream direction. The admixture of rennet and retentate flows past lugs 258 into expansion chamber 236, having conical surface 259, for final discharge from mixer body 230.

Figure 8:
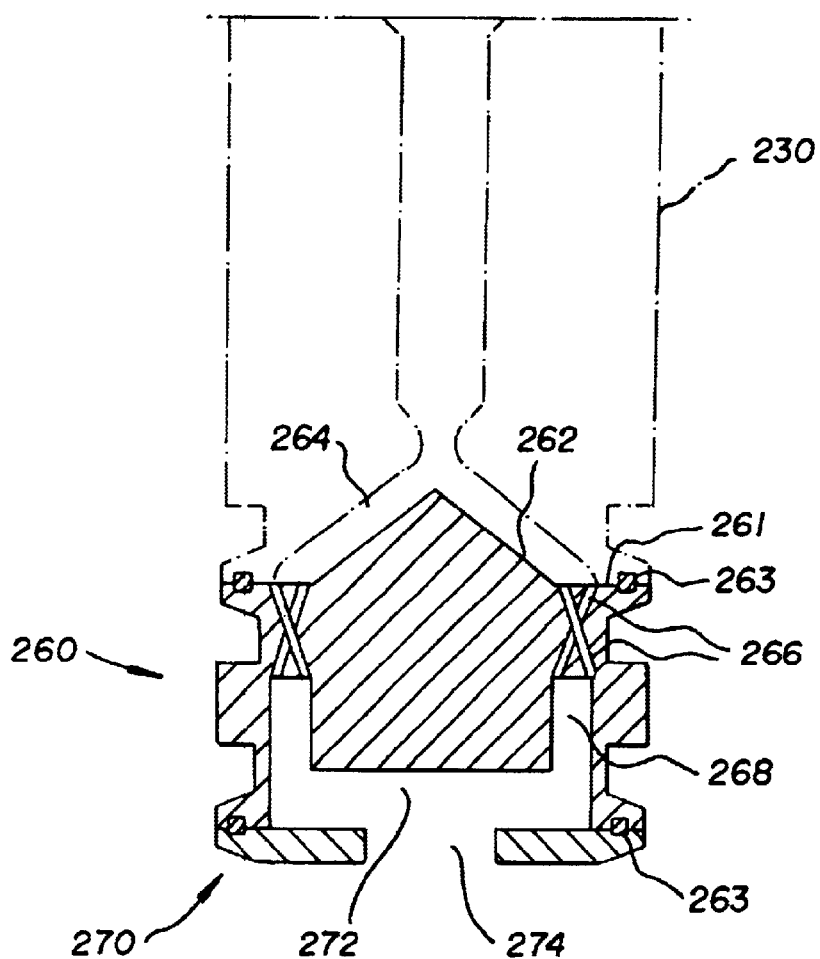
FIG. 8 is a sectional view illustrating the bores in the finisher.
Figure 9:
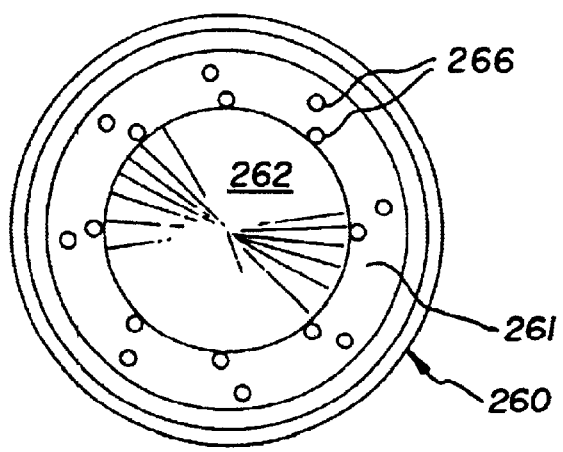
FIG. 9 is a top plan view of FIG. 8.

In the embodiment of the invention illustrated in FIGS. 8 and 9, the discharge end of the mixing assembly is adapted for use with what is referred to herein as a finisher that may be used when mixing extremely difficult components. The function of the finisher is to secure an even mix for extremely difficult components by forcing the mix exiting the mixer body to pass through a series of rotation of the liquid layer. After that, there is a final expansion chamber to slow down the liquid mix before reaching the outlet port in the finisher cap.

The bottom of mixer body 230 is configured to accommodate conical top 262 of finisher 260 and in combination therewith to form mixer distribution zone 264. Circumscribing conical top 262 is planar annular surface 261 which has a series of cross-oriented, paired finisher conduits 266 that serve to reserve position and to rotate mixture being finished. The finished mix is discharged into cylindrical channel 268.

As shown in FIG. 8, finisher 260 is attached to mixer body 230 by a gasket 263 and a standard clamp (not show in drawings) and finisher cap 270 is also attached by means of a gasket 263 and a standard clamp union (also not shown) to finisher 260. Finisher cap 270, in conjunction with finisher 260, forms finishing zone 272 and provides precheese outlet 274.

The size of the mixer may vary dependant on the size and nature of cheese being formed. It is contemplated in accordance with the present invention to combine a plurality of small mixing assemblies and to consolidate their effluent into a single stream.

As an example, where a typical two-inch T-section was used for fabrication of the mixer assembly, the mixer head was constructed of 0.375diameter stainless steel. The opposing walls which delimit the film thickness were situated about 1.5 to 2 mm apart to form a retentate film of corresponding thickness. In such assembly the spaced-apart rennet grooves suitably are 20–30 in number (they are located 12–18 degrees apart) and about 0.003 inches deep and V-shaped.

The mixing assembly of the present invention is particularly adapted to providing a highly uniform admixture of coagulant and precheese in a continuous stream which can be formed into a continuous rope of cheese product. This continuous rope of cheese can be cut into cheese portions of any desired weight. The advantage of uniform mixture achieved in the present mixer also find applications in non-continuous operations. The achievement of uniform admixture using the mixer assembly of the present invention, including the optional finisher, also further finds application with other feedstocks in addition to rennet and retentate.

The method finds general application in mixing a variety of fluids, especially fluids comprised of liquids which in the absence of rapid uniform admixture tend to coagulate/solidify in a non-uniform manner and form multiphase/polyphase admixtures and/or otherwise non-uniform products. The apparatus and method of this invention can accordingly be used in all application where rapid uniform mixing is advantageous. This includes production of physical mixtures within interaction, production of reactant mixtures, including polymerization and catalytic processes.

Moreover, the mixing method of the present invention and the described mixer may be sized appropriate to the materials being treated and in fact mixing can be effected using a plurality of mixers in series or in parallel. In series, the mixing is sequential and the components that are added in each succeeding mixer may differ.

In the case of formation of a coagulant and precheese mixture, where the mass of mixture required is a multiple of the precheese exiting a single mixer, the admixtures o of parallel mixers may be combined.

The mixing assembly of the present invention finds particular utility in the critical step of cheese production by ultrafiltration of milk, because such process involves the mixing of rennet with highly viscous milk retentate. The use of conventional mixing devices often produces uneven mixing and, as a consequence, irregular coagulation is obtained. Irregular coagulation produces layers in the final cheese with poor, unacceptable structure.

This problem occurs because the high viscosity of the retentate makes it difficult to distribute the dosed rennet evenly. (Rennet is added in very small amounts compared with the retentate into which the rennet is added.) An added difficulty derives from the fact that retentate reacts very rapidly with rennet so that the mixture simultaneously coagulates, becoming solid and therefore making it very difficult, if not impossible, to disperse the remaining rennet within the remaining retentate in liquid form. The mixing assembly of the present invention addresses this problem and enables continuous precheese formation to occur.

In accordance with the present invention, the conventional sequence (dosing, followed by injecting, followed by dispersion or diffusion) is changed to a new sequence (dosing, followed by dispersion, followed by injecting). In addition, the mixing assembly and method of the embodiment of the present invention relating to mixing, treats retentate which is moving at very high linear speed inside the mixer—with the additional benefit of reducing the actual viscosity of the retentate. The physical size (internal volume) of the mixer can be kept to the absolute minimum required.

The linear flow is adjusted to avoid even partial coagulation. The time that the retentate spends in the mixing device following injection until it exits is most preferably on the order of hundredths of a second and, in any event, less than half a second. The thickness of the retentate film in the annulus is most preferably in the range of from about 1.5 mm to about 2 mm although films of from about 0.5 mm to about 3 mm can be used, although not necessarily with the same results.

Referring to the embodiment of the invention illustrated in the drawings, the mixer head is most preferably on the order of 3 inches in length, and preferably less than 6 inches in length. Depending on the target capacity, the diameter of the annulus is adjusted to increase or decrease capacity. This is done by changing the diameter of the mixing head with, of course, a corresponding change in the mixer body to maintain the selected thickness of the film.

The finisher—and optional part that can be installed if needed—reinforces the dispersion of rennet within the retentate and slows down the mix to avoid splashes in the coagulation unit to which the precheese admixture made in accordance with the present invention is fed. In accordance with the present invention, addition to the internal volume of the mixer is minimal.

The mixer body is machined from a solid piece of material (either stainless steel or sanitary polymer) with a clamp union on each end to attach it to the T-connector at its upper end and to the finisher on the lower end.

The mixer body can be viewed as having three chambers:
a. a receiving chamber for retentate. In this part the formation of a thin layer of retentate is initiated in preparation for the rennet injection.
b. an injection chamber, where the rennet is actually injected into the thin layer of retentate created in the receiving chamber. After injection of rennet, the thin layer mix optionally encounters a series of turbulence promoters (eight are shown) to facilitate even distribution of rennet.
c. an expansion chamber, where the thin layer of retentate-rennet mix slows down and exits the mixer body and optionally enters a finisher.

The use of a head adaptor allows the use of the same mixer with different heads and bodies. It provides the connection of the mixer head to the T-connector cap, centers the mixer head in relation to the mixer body and serves as a conduit for the rennet between the rennet inlet port at the T-connector cap and the rennet nozzles at the upper part of the mixer head.

The mixer head is a critical part of the mixer assembly. Together with the mixer body, it forms the thin layer of retentate essential for a good, even mix. The upper part of the mixer head contains threads to attach it firmly to the head adapter. Alignment with the head adapter is secured by a shoulder that follows the threaded part. Threads and shoulder have open channels cut across them to allow the rennet to reach the nozzles. The mid part of the mixer head contains the injection nozzles to evenly distribute the rennet full circle. The lower part of the mixer head has turbulence promoters cut into it.

The finisher is an optional part. Its function is to secure an even mix in those cases of extremely difficult products by forcing the mix exiting the mixer body to pass through a series of orifices that reverse position and sense of rotation of the liquid layer. After that, there is a final expansion chamber to slow down the liquid mix before reaching the outlet port in the finisher cap.

Attached to the finisher by means of standard clamp union, the finisher cap provides the outlet port for the liquid mix. It can be fitted with an internal mesh (not shown) to further reduce splashing.

It is not intended to limit the method and/or apparatus of the present invention to the particular embodiment described herein, and various modifications may be made, including, but not limited to, changes in dimensions, shape and materials, without departing from the scope and spirit of the invention as set forth in the following claims.

I claim:

1. An apparatus for mixing viscous liquids with a reactant, catalyst, or coagulant, said apparatus comprising mixing assembly (200) and a finisher (260); said mixing assembly (200) comprising:
   (a) T-connector (220) comprising a straight section, having a central opening with an inlet end and a delivery end, and an inlet section, disposed perpendicularly to said straight section, having inlet opening (222) connected to said central opening, delivery pipe (221) being axially attachable to said inlet opening (222);
   (b) T-connector cap (210) having a central opening;
   (c) mixer body (230) having an inlet end with an initial opening that coincides with said central opening of said T-connector (220) and then converges into an intermediate receiver opening and then further converges into a turbulence opening, finally narrowing into an outlet opening that diverges into expansion chamber (236), said mixer (230) being attached to said delivery end of said T-connector (220);
   (d) a mixer head adaptor (240), in said central opening of said T-connector cap (210), having an outer surface with approximately the same diameter as said central opening of said T-connector cap (210) to form retentate passageway (226) with said central opening of said T-connector (220), comprising:
      (1) an inlet end for said reactant, catalyst or coagulant, having a reactant, catalyst or coagulant opening (241) and internal threads (242) therein,
      (2) an outlet end having bottom surface (247) surrounding outlet opening (244),
      (3) an elongated channel for said reactant, catalyst or coagulant that is connected to said inlet opening (241) and is of smaller diameter,
      (4) accelerator (248), near said outlet end of said mixer head adaptor (240), having sloping shoulders and a larger diameter than said outer surface to form accelerating zone (232) with said intermediate receiver opening,
      (5) a plurality of centering lugs that are disposed on said accelerator (248),
      (6) a plurality of radially disposed ports (245) in said outlet end having bottom surface (247), whereby a plurality of liquid jets impact upon a thin film of said liquid from said accelerating zone (232) to form an injection zone,
      (7) internal threads (249), within said accelerator (248), that extend partially to said outlet end having bottom surface (247);
   (e) mixer head (250) of integral construction, comprising:
      (1) an externally threaded portion, having threads (251), that is screwably inserted into said threads (249),
      (2) a plurality of longitudinally disposed grooves (252) in said threads (251),
      (3) receiver (255), having radial surface (259) and circular recess (256) therein that is flowably connected to said grooves (252) and to said ports (245), said grooves emptying into said circular recess (256) and said bottom surface (247) being in contact with said surface (259), (4) a plurality of turbulence promoters (257) that are disposed adjacent to said receiver (255) within a turbulence zone downstream of said injection zone, (5) a centering section, adjacent to said turbulence promoters (257) and downstream thereof, having a plurality of centering lugs (258) that center said mixer head (250) within said turbulence zone; and, (f) said finisher (260) being attached to said mixer body (230) at the bottom thereof, said finisher (260) comprising:

(1) conical top (262) that is in parallel to the surface of said chamber (236) to form diverging mixer distribution zone (264);

(2) annular surface (261) surrounding said conical top (262);

(3) a series of cross-oriented, paired finisher conduits (266) that serve to reverse position and sense of rotation of the mix being finished; and (4) a cylindrical channel into which the finished mix is discharged by said conduits (266).

2. A finisher (260) for securing an even mix of extremely difficult components after passage through a mixer (200) having conical discharge chamber (236), comprising:

(a) conical top (262) that is in parallel to the surface of said chamber (236) to form diverging mixer distribution zone (264);

(b) annular surface (261) surrounding said conical top (262);

(c) a series of cross-oriented, paired finisher conduits (266) that serve to reverse position and sense of rotation of the mix being finished; and (d) a cylindrical channel into which the finished mix is discharged by said conduits (266).

3. The finisher of claim 2, wherein finisher cap (270) is selectively attached to said finisher (260), forming a finishing zone (272) and a precheese outlet (274).

* * * * *